(No Model.)
C. SHREWSBURY.
HORSE TAIL TETHER.
No. 244,491. Patented July 19, 1881.
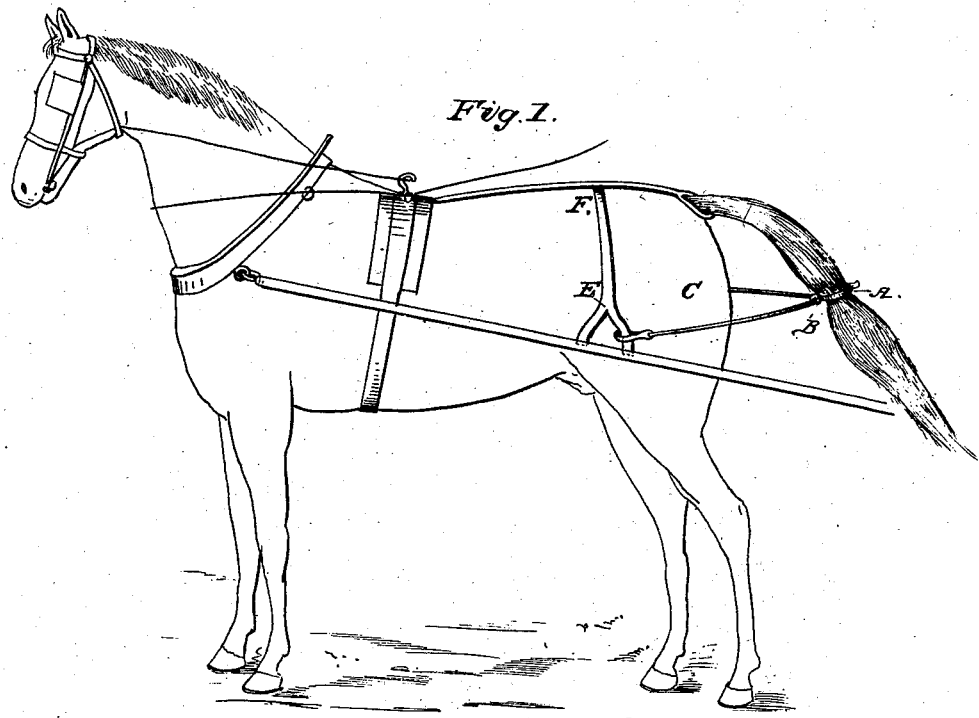
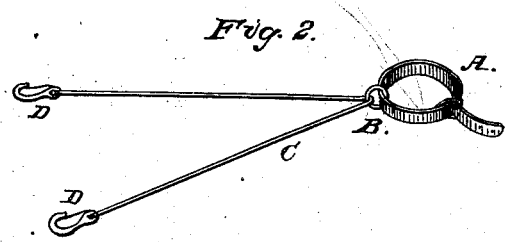

UNITED STATES PATENT OFFICE.

COLUMBUS SHREWSBURY, OF POINT PLEASANT, WEST VIRGINIA.

HORSE-TAIL TETHER.

SPECIFICATION forming part of Letters Patent No. 244,491, dated July 19, 1881.

Application filed October 14, 1880. (No model.)

*To all whom it may concern:*

Be it known that I, COLUMBUS SHREWSBURY, of Point Pleasant, in the county of Mason and State of West Virginia, have invented certain new and useful Improvements in Horse-Tail-Tether Attachments for Harness; and I do hereby declare that the following is a full, clear, and exact description of the invention, which will enable others skilled in the art to which it appertains to make and use the same, reference being had to the accompanying drawings, which form a part of this specification.

Figure 1 is a view of my improved tail-tether, showing the manner of attaching it to the animal; and Fig. 2 is a view of the device detached.

Corresponding parts in both figures are denoted by like letters of reference.

My invention consists of certain improvements in the construction and operation of tail-tether attachments for the harness of horses and other animals, and has for its object the construction of a device for preventing the interference of the tails of horses, either in single or double harness, with the driving-lines, but still at the same time allowing the animal free and easy movement of his tail, substantially as will be hereinafter more fully described, and particularly pointed out in the claims.

Referring by letter to the drawings, A designates the tail-strap, which is buckled or fastened in any other suitable manner around the tail of the horse. On the tail-strap A slides a ring, B, through which passes a strap or cord, C, which is provided at both ends with a snap-hook, D, or other fastening device, whereby it may be removably secured on each side to the rear part, E, of the lower ∧-shaped portion of the hip-straps F.

My device for securing the tails of horses in harness, while it does not interfere with the comfort of the animal, is of the greatest convenience to the driver. It is simple, cheap, durable, and easily adjusted or removed. It allows the animal the free use of his tail on either side, as the strap C will pass through the ring B as the tail is moved from side to side. The snap-hooks D may also slide on the portion E of the hip-straps F, thus permitting the animal to lower or raise his tail, but not to such an extent as to throw it over the driving-lines.

Having thus described my invention, I claim as my invention and desire to secure by Letters Patent of the United States—

1. The combination, with the hip-straps F, or rear portion of a harness, of the tail-tether attachment composed of the strap or cord C, ring B, and tail-strap A, connected together and to said rear portion of harness, substantially in the manner as and for the purpose specified.

2. The herein-described tail-tether attachment, composed of the tail-strap A, ring B, and strap or cord C, having suitable fastening devices D, all connected together, as and for the purpose specified.

In testimony that I claim the foregoing as my own I have hereto affixed my signature in presence of two witnesses.

COLUMBUS SHREWSBURY.

Witnesses:
CHARLES W. PHELPS,
JNO. E. TIMMS.